June 5, 1962  P. R. GUEST ET AL  3,037,460

PUMPS

Filed April 26, 1960

INVENTORS
P. R. GUEST
A. R. REINARZ

BY *D. C. Roylance*

ATTORNEY

United States Patent Office 3,037,460
Patented June 5, 1962

3,037,460
PUMPS
Paul R. Guest, Toledo, Ohio, and Alvin R. Reinarz, Gainesville, Tex., assignors, by mesne assignments, to Armco Steel Corporation, Middletown, Ohio, a corporation of Ohio
Filed Apr. 26, 1960, Ser. No. 24,746
13 Claims. (Cl. 103—216)

This invention relates to improvements in heavy duty, piston type pumps. While not limited thereto, the invention has particular application to pumps of the type used in the oil well industry for circulating thick fluent materials, such as mud, cement or the like.

Due to the nature of the material being pumped, the high pressures necessary to effect the desired circulation, and the high flow rates, pumps of the aforementioned type are unusually large in size and weight, and require a great amount of power for operation. Generally, such pumps comprise a cylinder having disposed therein a removable liner in which a piston reciprocates to effect the desired pumping action. The cylinder is open at the fluid end of the pump and means are necessary for securing the liner in place and for sealing the fluid end of the pump.

In the past, most pumps have been constructed so that the force for securing the liner in place passes through packing. Consequently, it frequently occurs when the pump is operating that forces are created which tend to reciprocate or otherwise cyclically move the liner, cylinder head, securing means and the packing and thereby wear away, deteriorate or destroy some or all of these elements, causing the pump to break down or otherwise become ineffective and inefficient. To overcome this, it has been proposed that the cylinder liner be secured in place in such manner that the securing forces pass only through elements having metal-to-metal contact therebetween. Such metal-to-metal hold down for the cylinder liner is, however, difficult to accomplish.

Consequently, one of the objects of this invention is to provide improved means for securing a cylinder liner in place and sealing the fluid end of the cylinder in a heavy duty reciprocating pump.

Another object is to provide means for securing a liner in a heavy duty pump whereby the securing force passes through elements having only metal-to-metal contact therebetween.

Another object is to provide, in a pump structure of the type described, multiple packings and means for energizing the same in such fashion that the forces for energizing the packings are not applied through the packings in series.

Still another object is to provide means for sealing the fluid end of a cylinder whereby rotation of a single screw causes a seal to be effected between the liner and the cylinder, and between the cylinder and the cylinder head.

A further object of this invention is to provide means for independently adjusting the sealing means without decreasing the force necessary to hold the liner in place.

In order that the manner in which these and other objects are attained in accordance with the invention can be understood in detail, reference is had to the accompanying drawing, which forms a part of this specification, and wherein.

Figure 1:
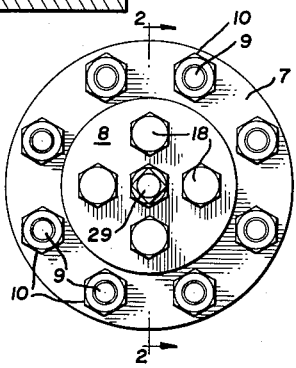
FIG. 1 is a fragmentary and elevational view of a pump constructed in accordance with one embodiment of the invention.

Referring now to the drawing in detail, there is shown in FIG. 1 a portion of a typical heavy duty double-acting reciprocatory pump of the general type shown, for example, in U.S. Patent 2,717,186, issued September 6, 1955, to Campbell, used in the oil well industry for pumping mud, cement or the like under high pressure, comprising a pump body or casing having a metal cylinder indicated generally at 1. In cylinder 1 is inserted a metal liner 2 in which a piston is adapted to reciprocate in conventional fashion for pumping material through the fluid end 3 of cylinder 1.

Cylinder 1 has a cylindrical bore 4 which extends axially through the cylinder body and opens at the head end of the pump (at the right, as viewed in FIG. 1). Bore 4 includes a transverse annular shoulder 5 which faces the head end of the pump and provides a seat or stop shoulder for positioning liner 2 in cylinder 1, shoulder 5 being formed by counterbore $4^a$. The head end of the bore is further enlarged by a second counterbore $4^b$.

Liner 2 is cylindrical and is provided with a medially located, outwardly extending, annular flange 6, the rear annular face of which abuts shoulder 5. The dimensions of shoulder 5 and flange 6 are chosen to permit the liner 2 to be seated in cylinder 1 and held in place by a relatively large force applied as pointed out hereinafter.

Figure 2:
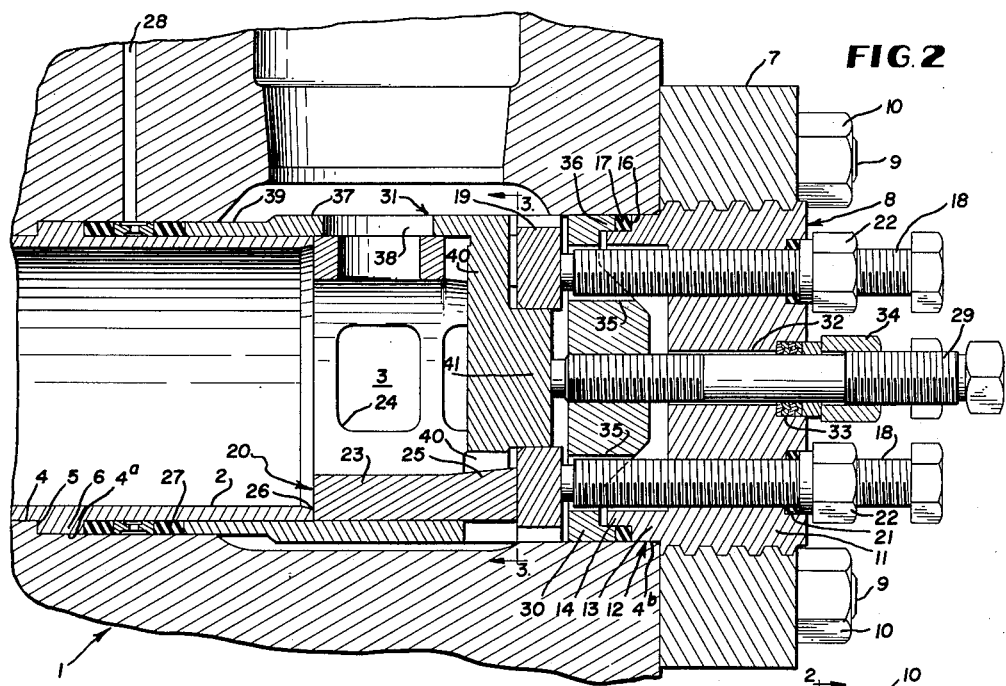
FIG. 2 is a longitudinal sectional view, on an enlarged scale, taken on line 2—2, FIG. 1.

A cylinder head, including a ring 7 and a plug 8, is attached to the front end of cylinder 1, in metal-to-metal contact therewith, by a plurality of threaded studs 9 and nuts 10. Ring 7 has an internally threaded, axially extending bore, the diameter of which is greater than the diameter of counterbore $4^b$ so that liner 2, and other elements described hereinafter, can be removed from cylinder 1 without having to remove ring 7. Each of studs 9 is rigidly fixed to the front of cylinder 1 in any suitable manner and extends through an aperture suitably formed in ring 7. The end face of the cylinder body is flat, lying in a plane which extends transversely of and at right angles to the longitudinal axis of the cylinder bore. Ring 7 has flat, parallel end faces. As seen in FIG. 1, studs 9 are equally spaced in a circularly extending series. As will be clear from FIG. 2, nuts 10 engage the front face of ring 7, urging the rear face of the ring into face-to-face contact with the end face of the cylinder body.

Plug 8 comprises a cylindrical, exteriorly threaded main body portion 11 of such diameter as to be threadedly received by the interiorly threaded bore of ring 7. From the face of plug 8 which is to be directed toward the interior of the cylinder, there extends from body portion 11 a tubular projection 12 including a root portion 13 having an outer diameter slightly smaller than that of counterbore $4^b$, and a tip portion 14 having an outer diameter substantially smaller than that of counterbore $4^b$. Since the diameter of the bore of ring 7 is larger than that of counterbore $4^b$, the diameter of body portion 11 is also larger than that of bore 4, so that an annular transverse shoulder is provided, as indicated at 15, between portions 11 and 12 of the plug.

The outer cylindrical surface of tip 14 of projection 12 is spaced inwardly from the cylinder wall. The junction between tip 14 and root portion 13 provides a transverse annular shoulder 16 facing toward the interior of the cylinder. An annular packing 17 surrounds tip 14 and engages the cylinder wall and shoulder 16 to effect a seal between the cylinder head and the cylinder body, packing 17 being energized as hereinafter explained.

Liner 2 is held in place by metal-to-metal hold-down means including the cylinder head, a plurality of screws 18, a transversely disposed metal pressure ring 1 and a hold-down cage member 20. Plug 8 is provided with a plurality of axially extending threaded bores equal in number to screws 18 and spaced equally in a circularly extending series which is centered on the axis of the cylinder. Screws 18 are each substantially longer than the axial dimension of plug body portion 11. Each screw extends through a different one of the circularly arranged bores, being threadedly engaged therein, the hexagonal heads of the bolts being located outside of the cylinder structure and the tips projecting inwardly of the cylinder into engagement with ring 19. At the outer face of plug 8, the bores receiving screws 18 are each counter-bored to accommodate packings 21 energized by nuts 22 threaded each on one of the screws 18.

Hold-down cage member 20 has a hollow cylindrical body portion 23 provided with lateral openings 24 through which the pumped material flows. A plurality of projections 25 extend axially from body portion 23 and engage the rear face of ring 19. At its rear, hold-down member 20 has a transverse annular shoulder portion which abuts the front end of liner 2, as seen at 26. Thus, the force exerted by screws 18 on ring 19 causes hold-down cage member 20 to apply a longitudinal force to liner 2 to hold flange 6 in contact with shoulder 5.

Ring 7, plug 8, screws 18, ring 19 and hold-down member 20 are all constructed from suitable metal. Consequently, the hold-down force for liner 2 passes through elements having only metal-to-metal contact therebetween.

The portion of liner 2 in front of flange 6 has an outside diameter less than the diameter of the adjacent portion of counterbore 4ª, providing an annular recess in which an annular packing 27 is disposed adjacent to a telltale hole 28. Packings 17 and 27 are radially expansible into sealing engagement under compressive forces applied axially thereto.

Packings 17 and 27 are energized by means comprising a single screw 29, an outwardly acting pressure plate 30 and an inwardly acting cage member 31. Screw 29 extends through an unthreaded, axially extending bore 32 at the center of plug body portion 11. The tip portion of screw 29 is operatively engaged in a centrally disposed, axially extending bore through pressure plate 30, the tip of the screw extending inwardly beyond plate 30 into engagement with cage member 31 as later described. Bore 32 is counter-bored, at the outer face of plug body portion 11, to accommodate packing 33, which packing is energized to seal between screw 29 and plug 8 by the action of a nut 34 working on screw 29, as shown.

In addition to the threaded bore in which screw 29 is engaged, plate 30 is provided with a circularly arranged series of plain bores 35 each freely passing a different one of the hold-down screws 18. Plate 30 is circular, having a diameter such as to fit snugly but slidably within the cylinder bore 4. At its periphery, plate 30 is provided with a cylindrical flange 36 projecting into the annular space between the cylinder wall and tip portion 14 of plug 8, the radial thickness of flange 36 being substantially equal to the radial distance between portion 14 and the cylinder wall. The central body portion of plate 30 is of frusto-conical form, tapering toward plug 8, so that the threaded central bore in which screw 29 works is of substantial length.

Figure 3:
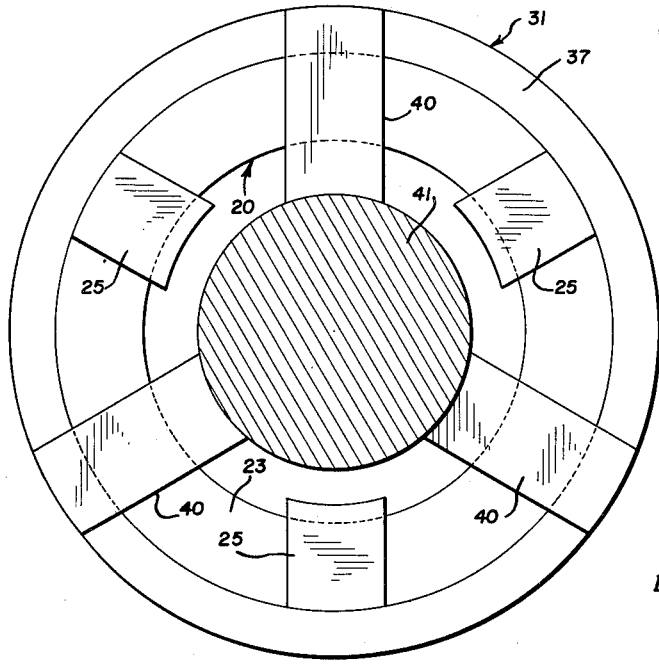
FIG. 3 is a view, partly in transverse section and partly in end elevation, taken on line 3—3, FIG. 2.

Member 31 includes a cylindrical main body portion 37 provided with lateral openings 38 to allow flow of the pumped material, a cylindrical tip portion 39 telescopically engaged over the end of liner 2 and engaged with packing 27, and a transversely extending spider comprising radial arms 40 and axially projecting cylindrical hub 41. Portions 37, 39 and 41 are integral parts of a rigid metal structure. Hub 41 projects through the central opening of ring 19, the tip of hub 41 being directly engaged by the tip of screw 29. Main body portion 37 slidably embraces hold-down cage member 20. As will be clear from FIGS. 2 and 3, projections 25 of cage member 20 extend each between a different pair of the radial arms 40. With projections 25 spaced uniformly, openings 24 and 38 are in complete registry.

Since screw 29 is threadedly engaged with pressure plate 30, and since the tip of the screw engages cage member 31, rotation of the screw in one direction will cause pressure plate 30 and cage member 31 to be moved axially away from each other and thus respectively into engagement with packings 17 and 27.

Ring 19 and central body 41 of cage member 31 are each of substantial dimension axially of the assembly. The relative axial dimensions of hold-down cage member 20, cage member 31 and ring 19 are such that ring 19 is always spaced from arms 40 of member 31, so that hold-down pressure applied by screws 18 via ring 19 is not imparted to packing energizing cage member 31. The central bore of ring 19 is in direct slidable engagement with the cylindrical surface of the axially projecting hub 41 of member 31, so that ring 19, while movable axially, is constrained to a transverse position relative to the pump cylinder.

From the foregoing, it will be clear that the configuration and telescopic arrangement of cage members 20, 31 allows the hold-down force, applied to liner 2, to be established independently of energization of the packings 17, 27, while the forces to compress the packings are in turn established independently of the hold-down action. For removal of all parts from the cylinder, the hold-down force and the packings are first relieved by loosening screws 18 and 29 and plug 8 is then unscrewed from ring 7, the assembly comprising plug 8, screws 18 and 29, and pressure plate 30 being removed as a unit, after which the cage members and the cylinder liner can be withdrawn from the cylinder. It will be noted that the head portions of screws 18 project outwardly beyond the tips of studs 9 so that, with screw 29 removed, a suitable lever, such as the handle of a wrench, can be disposed diametrically across the outer face of plug 8 between screws 18, to allow a large turning force to be applied to the plug for tightening or removal thereof. Since plate 30 fits snugly within the cylinder bore, the central threaded opening thereof is always aligned with the plain bore 32 in plug 8 when the plug is in place. Thus, packing actuating screw 29 can be inserted after the plug is screwed in place.

What is claimed is:

1. In a heavy duty reciprocatory pump having pump body means defining a cylinder having an open end, the body means presenting a fixed abutment facing the open end of the cylinder but spaced axially therefrom, and a removable liner disposed in the cylinder in contact with the abutment, the end of the liner nearest the open end of the cylinder being spaced therefrom, the combination of a cylinder head fixedly mounted on the pump body means to close the open end of the cylinder and including a cylindrical portion projecting into the cylinder; two hollow cage members disposed one within the other and located between the end of the liner and the cylinder head, said cage members being constructed and arranged for movement relative to each other axially of the cylinder, the inner cage member abutting the liner and including a plurality of circularly spaced portions projecting through the outer cage member toward said cylinder head, the outer cage member including at one end a cylindrical portion slidably engaged over the end of the liner and at the other end a portion centered in the cylinder and projecting toward the cylinder head; means for applying a hold-down force to said inner cage member to urge the same axially against the liner, said means including a plurality of hold-down screws extending longitudinally of the cylinder and carried by said cylinder head, said screws extending through said cylinder head and being threadedly associated therewith; a first annular packing surrounding the liner and disposed for engagement by the tip of said cylindrical portion of said outer cage member; a single packing energizing screw extending through said cylinder head into engagement with said centered portion of said outer liner; a second annular packing surrounding said cylindrical portion of said cylinder head, and packing energizing means separate from said cage members and operatively disposed in the cylinder adjacent said cylinder head to engage and compress said second packing, a part of said packing energizing means being threadedly carried by said single packing energizing screw.

2. A pump in accordance with claim 1 and wherein said means for applying a hold-down force to said inner cage member includes a ring slidably embracing said centered portion of said outer cage member and disposed transversely of the cylinder, one face of said ring engaging said circularly spaced portions of said inner cage member, the other face of said ring being engaged by said hold-down screws.

3. In a cylinder liner hold-down and packing energizing assembly for heavy duty reciprocatory pumps, the combination of a tubular hold-down cage member having one end adapted for engagement with a cylinder liner and at the other end a plurality of spaced axially extending projections, each of said projections being radially spaced from the axis of said member and adapted to be energized by a force directed substantially along a path parallel to but spaced from said axis, and a packing energizing cage member comprising a tubular body slidably embracing said hold-down cage member, said packing energizing cage member also including a central axially extending portion and transverse wall means rigidly interconnecting said central portion and said tubular body, said wall means defining openings through which said projections of said hold-down cage member extend, said central portion being adapted to be energized by a force directed along a path substantially coincident with said axis.

4. A cylinder liner hold-down and packing energizing assembly for heavy duty reciprocatory pumps in accordance with claim 3 and further comprising a ring slidably embracing said central portion of said packing energizing cage member and extending across the tips of said projections of said hold-down cage member.

5. In a heavy duty reciprocatory pump having pump body means defining a cylinder having an open end, the body means presenting a fixed abutment facing the open end of the cylinder but spaced axially therefrom, and a removable liner disposed in the cylinder in contact with the abutment, the end of the liner nearest the open end of the cylinder being spaced therefrom, the combination of annular packing means disposed between the cylinder liner and the cylinder and arranged to be energized into sealing engagement between the liner and cylinder by forces applied to the packing longitudinally of the cylinder; a hollow packing energizer disposed in the cylinder at the end of the liner, said energizer including transversely extending wall means disposed between the end of the liner and the adjacent end of the cylinder and a tubular portion extending slidably over the end of the liner into engagement with said packing, said wall means being provided with a plurality of openings radially spaced from the axis of the cylinder and angularly spaced from each other; a hold-down member disposed within said energizer in engagement with the end of the liner and including a plurality of projections extending longitudinally of the cylinder through said openings in said wall means; a cylinder head fixedly mounted on the body means of the pump; means including first screw means carried by said cylinder head for applying a hold-down force to each of said projections of said hold-down member, said force being directed along a path parallel to and spaced from the axis of the cylinder; and second screw means carried by said cylinder head for applying a force substantially along the axis of the cylinder to said wall means of said energizer for energizing said packing.

6. A pump in accordance with claim 5 and wherein said cylinder head comprises an internally threaded ring secured to the body means of the pump and an exteriorly threaded closure member threadedly engaged in said ring and extending across the open end of the cylinder, both of said screw means being carried by said closure member.

7. A pump in accordance with claim 6 and wherein said first screw means comprises a plurality of screws arranged in a circular series concentric with the axis of the cylinder, each of said screws projecting through said closure member longitudinally into said cylinder, and a member extending transversely of the cylinder in engagement with the ends of said projections of said hold-down member, the tips of the screws of said first screw means engaging said transversely extending member, and said second screw means comprises a single screw projecting through said closure member and extending substantially along the axis of the cylinder into engagement with said energizer.

8. A pump in accordance with claim 5 and wherein said cylinder head includes a portion projecting into the cylinder, the combination further comprising a second annular packing disposed between the cylinder and said cylinder head portion, and a second packing energizer disposed in the cylinder adjacent to said cylinder head and including an annular portion engaging said second packing, said second energizer being operatively connected to said second screw means.

9. A pump in accordance with claim 7 and wherein said closure member includes a cylindrical portion projecting into the cylinder, the combination further comprising a second annular packing surrounding said cylindrical portion of said closure member, and a second packing energizer disposed in the cylinder adjacent to said closure member, said second energizer comprising a body extending transversely across the cylinder and having an annular portion disposed in engagement with said second packing, the body of said second energizer being provided with a central axially extending threaded bore, said single screw of said second screw means being threadedly engaged in said bore, rotation of said single screw in one direction effecting opposite movement of said energizers to energize both of said packings simultaneously.

10. In a heavy duty reciprocatory pump having body means defining a cylinder having an open end, and a liner disposed in the cylinder and spaced from the open end thereof, the combination of a cylinder head fixedly mounted on the pump body means and closing the open end of the cylinder, said cylinder head comprising a cylindrical portion projecting into the cylinder; a first annular packing embracing said cylindrical portion of said cylinder head, said packing being arranged to be energized to seal between said cylinder head and the pump body means by force applied to the packing longitudinally of the cylinder toward said cylinder head; a first packing energizer disposed in the cylinder adjacent said cylinder head, said energizer comprising an annular portion disposed in engagement with said first packing on the side thereof opposite said cylinder head, said energizer being provided with a threaded central bore extending axially of the cylinder; a second annular packing disposed between the liner and the cylinder and arranged to be energized to seal between the liner and the cylinder by force applied to the packing longitudinally of the cylinder away from said cylinder head; a second packing energizer comprising a tubular body slidably engaged over the end of the liner and extending into engagement with said second packing, said second energizer also including a transverse portion disposed on the axis of the cylinder between the liner and said cylinder head, and a screw extending longitudinally through said cylinder head along the axis of the cylinder into engagement with said transverse portion of said second energizer, said screw being threadedly engaged in said central bore of said first energizer, rotation of said screw in one direction effecting movement of said energizers away from each other to energize both of said packings.

11. In a heavy duty reciprocatory pump having pump body means defining a cylinder having an open end, the body means presenting a fixed abutment facing the open end of the cylinder but spaced axially therefrom, and a removable liner disposed in the cylinder in contact with the abutment, the end of the liner nearest the open end of the cylinder being spaced therefrom, the combination of a cylinder head closing the open end of the cylinder and comprising an outer member rigidly mounted on the pump body means and having an interiorly threaded opening surrounding the open end of the cylinder and an exteriorly threaded circular plug member threaded into said outer member, said plug member having a main body portion of larger diameter than the cylinder and also including a cylindrical portion projecting into the cylinder, said body portion including a shoulder directly engaging the body means of the pump; a first annular packing surrounding said cylindrical portion of said plug member and arranged to be energized to seal between said cylindrical portion and the cylinder by force applied thereto longitudinally of the cylinder toward said plug member; a second annular packing surrounding the lining and arranged to be energized to seal between the liner and the cylinder by force applied thereto longitudinally of the cylinder away from said plug member; inner and outer hollow cage members disposed in the cylinder between the liner and said plug member and arranged for movement relative to each other longitudinally of the cylinder, said outer cage member having a portion spaced from the liner toward said plug member and extending transversely of the cylinder and another portion slidably engaged over the end of the liner and disposed in contact with said second packing, said inner cage member being in contact with the liner and comprising portions projecting toward said plug member and spaced radially from the central axis of the cylinder; hold-down force applying means in longitudinal engagement with said projecting portions of said inner cage member, said hold-down force applying means comprising a plurality of screws carried by and threadedly engaged in said plug member, said screws extending longitudinally of the cylinder and being spaced in a circular series concentric with the axis of the cylinder; and packing energizing force means comprising a single screw extending centrally through said plug member along the axis of the cylinder into engagement with said transversely extending portion of said outer cage member, and a packing energizing member threadedly carried by said single screw and including an annular flange projecting toward said plug member into engagement with said first packing.

12. In a heavy duty reciprocatory pump having pump body means defining a cylinder having an open end, the body means presenting a fixed abutment facing the open end of the cylinder but spaced axially therefrom, and a removable liner disposed in the cylinder in contact with the abutment, the end of the liner nearest the open end of the cylinder being spaced therefrom, the combination of a cylinder head closing the open end of the cylinder and comprising an outer member fixedly mounted on the pump body means in metal-to-metal contact therewith and having an interiorly threaded opening disposed coaxially with the cylinder, said opening being larger than the diameter of the cylinder, and an exteriorly threaded plug member threadedly engaged in said opening of said outer member and longitudinally engaged with the pump body means at the open end of the cylinder, said plug member having a cylindrical portion extending into the cylinder; a first annular packing surrounding said cylindrical portion and arranged to be energized to seal between the cylinder head and the cylinder by force applied longitudinally toward said plug member; a second annular packing surrounding the liner and arranged to be energized to seal between the liner and the cylinder by force applied longitudinally away from said plug member; a hold-down cage member disposed in the cylinder in longitudinal engagement with the end of the liner; hold-down force applying means operatively engaged with said hold-down member and comprising first screw means projecting longitudinally through said plug member; a first packing energizer disposed in the cylinder adjacent said plug member and having an annular portion engaging said first packing; a second packing energizer surrounding said hold-down member and movable longitudinally in the cylinder with respect to said hold-down member, said second energizer including an annular portion engaged with said second packing; and second screw means extending longitudinally through said plug member and operatively connected with said first and second energizers to apply energizing force to both of said packings.

13. In a heavy duty reciprocating pump having body means defining a cylinder having an open end, and a liner disposed in the cylinder and spaced from the open end thereof, the combination of a cylinder head fixedly mounted on the pump body means and closing the open end of the cylinder, said cylinder head comprising a cylindrical portion projecting into the cylinder; a first annular packing embracing said cylindrical portion of said cylinder head, said packing being arranged to be energized to seal between said cylinder head and the pump body means by force applied to the packing longitudinally of the cylinder toward said cylinder head; a first packing energizer disposed in the cylinder adjacent said cylinder head, said energizer comprising an annular portion disposed in engagement with said packing on the side thereof opposite said cylinder head; a second annular packing disposed between the liner and the cylinder and arranged to be energized to seal between the liner and the cylinder by force applied to the packing longitudinally of the cylinder away from said cylinder head; a second packing energizer comprising a tubular body slidably engaged over the liner and engaging said second packing; a hold-down member disposed within said second packing energizer in engagement with the end of the liner; first screw means carried by said cylinder head for applying a hold-down force to said hold-down member; and means including second screw means operative, upon actuation thereof, to effect movement of said energizers in opposite directions to energize both of said packings.

References Cited in the file of this patent
UNITED STATES PATENTS 2,717,186    Campbell _____ Sept. 6, 1955
2,869,945    Mattingly _____ Jan. 20, 1959